US006688093B1

(12) United States Patent
Franet et al.

(10) Patent No.: US 6,688,093 B1
(45) Date of Patent: Feb. 10, 2004

(54) SELF-PROPELLED AGRICULTURAL VEHICLE

(75) Inventors: Roger Franet, Sarreguemines (FR); Larry Neil Smith, Ottumwa, IA (US)

(73) Assignee: Deere & Company, Moline, IL (US)

( * ) Notice: Subject to any disclaimer, the term of this patent is extended or adjusted under 35 U.S.C. 154(b) by 15 days.

(21) Appl. No.: 09/690,534

(22) Filed: Oct. 16, 2000

(30) Foreign Application Priority Data

Oct. 23, 1999 (DE) ............................. 199 51 080

(51) Int. Cl.$^7$ .................................................. A01B 73/00
(52) U.S. Cl. .............................. 56/228; 56/15.3; 56/15.5
(58) Field of Search ..................... 56/6, 7, 13.6, 229, 56/228, 245, 16.7, 237, 264, 15.2, 15.8, 15.6, 15.3, 15.1, 16.4, DIG. 3, DIG. 22

(56) References Cited

U.S. PATENT DOCUMENTS

| 2,299,859 | A | * | 10/1942 | Speiser ............................ 56/7 |
| 3,429,109 | A | | 2/1969 | Heth et al. |
| 3,646,733 | A | * | 3/1972 | Clapsaddle, Jr. ................. 56/7 |
| 3,824,772 | A | * | 7/1974 | Sorenson et al. ................ 56/7 |
| 4,135,349 | A | * | 1/1979 | Schwertner ....................... 56/6 |
| 4,304,086 | A | * | 12/1981 | Stuchl ............................. 56/6 |
| 4,370,846 | A | * | 2/1983 | Arnold ............................ 56/6 |
| 4,409,780 | A | | 10/1983 | Beougher et al. |
| 4,434,605 | A | * | 3/1984 | Bailey ......................... 56/16.4 |
| 4,697,404 | A | * | 10/1987 | Brockmeier et al. ............. 56/6 |
| 4,854,112 | A | | 8/1989 | Holley et al. |
| 4,926,621 | A | * | 5/1990 | Torras .............................. 56/6 |
| 4,972,664 | A | * | 11/1990 | Frey ............................ 56/13.6 |
| 5,069,022 | A | * | 12/1991 | Vandermark ...................... 56/6 |
| 5,133,174 | A | * | 7/1992 | Parsons, Jr. ...................... 56/6 |
| 5,280,695 | A | * | 1/1994 | Nunes, Jr. et al. ............... 56/6 |
| 5,715,667 | A | | 2/1998 | Goman et al. |

FOREIGN PATENT DOCUMENTS

| DE | 297 19 765 | 2/1999 |
| EP | 0 808 556 | 11/1997 |
| EP | 0 808 557 | 11/1997 |

* cited by examiner

Primary Examiner—Árpád Fab Kovács

(57) ABSTRACT

The vehicle part of a self-propelled forage harvester includes a chassis supported on front and rear sets of wheels. A mower-conditioner unit is mounted to the front of the chassis and mounted to opposite sides of the chassis are second and third mower-conditioner units. Mounting each of the second and third mower-conditioner units to the chassis is a support arm having a first end region mounted to the chassis, either forward of the rear set of wheels, in accordance with a first embodiment, or rearward of the rear set of wheels, in accordance with a second embodiment, with the support arms being configured so that the first and second mower-conditioner units extend generally in transverse alignment with the rear set of wheels, when the support arms are in lowered working positions, and are disposed in positions above the individual wheels of the rear set of wheels when the support arms are in raised transport positions.

12 Claims, 5 Drawing Sheets

SELF-PROPELLED AGRICULTURAL VEHICLE

The invention concerns a self-propelled agricultural vehicle with a chassis, front and rear wheels and at least one working unit mounted by means of an arm to pivot vertically on the side of the chassis in order to assume at least one working and one transport position.

BACKGROUND OF THE INVENTION

DE-U1-297 19 765 discloses an agricultural mowing vehicle with three mowing and conditioning units, one of which is mounted on the front of the chassis and the remaining two mounted so that one is one each side of the chassis. The lateral mowing and conditioning units are carried by vertical pivotable arms, which are mounted to pivot between the wheels of a front and rear axle on the chassis. The mowing and conditioning units in a transport position are pivoted into the free space between the wheels.

The aforementioned patented design has the disadvantages of the vehicle being specially designed to accommodate the mowing and conditioning units between its wheels, this special vehicle design resulting in a relatively long wheelbase which results in a large turning radius.

SUMMARY OF THE INVENTION

According to the present invention, there is provided an improved manner of mounting a pair of opposite, laterally extending work units between front and rear sets of wheels of a self-propelled vehicle.

An object of the invention is to provide a coupling arrangement between opposite sides of a vehicle chassis and work units which permits front and rear sets of wheels of the vehicle to be relatively close together so that the turning radius of the vehicle is acceptable.

A more specific object of the invention is to provide a vehicle, as set forth in the previous object, wherein the coupling arrangements for the work units permits the units to be lifted from a working position alongside the rear set of wheels to a transport position above and within the width of the rear set of wheels.

Yet another object of the invention is to provide a vehicle and coupling arrangement, as set forth above, according to a first embodiment wherein the coupling arrangement is coupled to the chassis only at a location between the front and rear sets of wheels.

Another object of the invention is to provider a vehicle and coupling arrangement, as set forth above, according to a second embodiment wherein the main supporting structure of the lateral work units are mounted to a rear end of the chassis, with a stabilizing structure being located between the front and rear sets of wheels.

These and other objects of the invention will become apparent from a reading of the ensuing description together with the appended drawings.

DESCRIPTION OF THE PREFERRED EMBODIMENT

Figure 1:
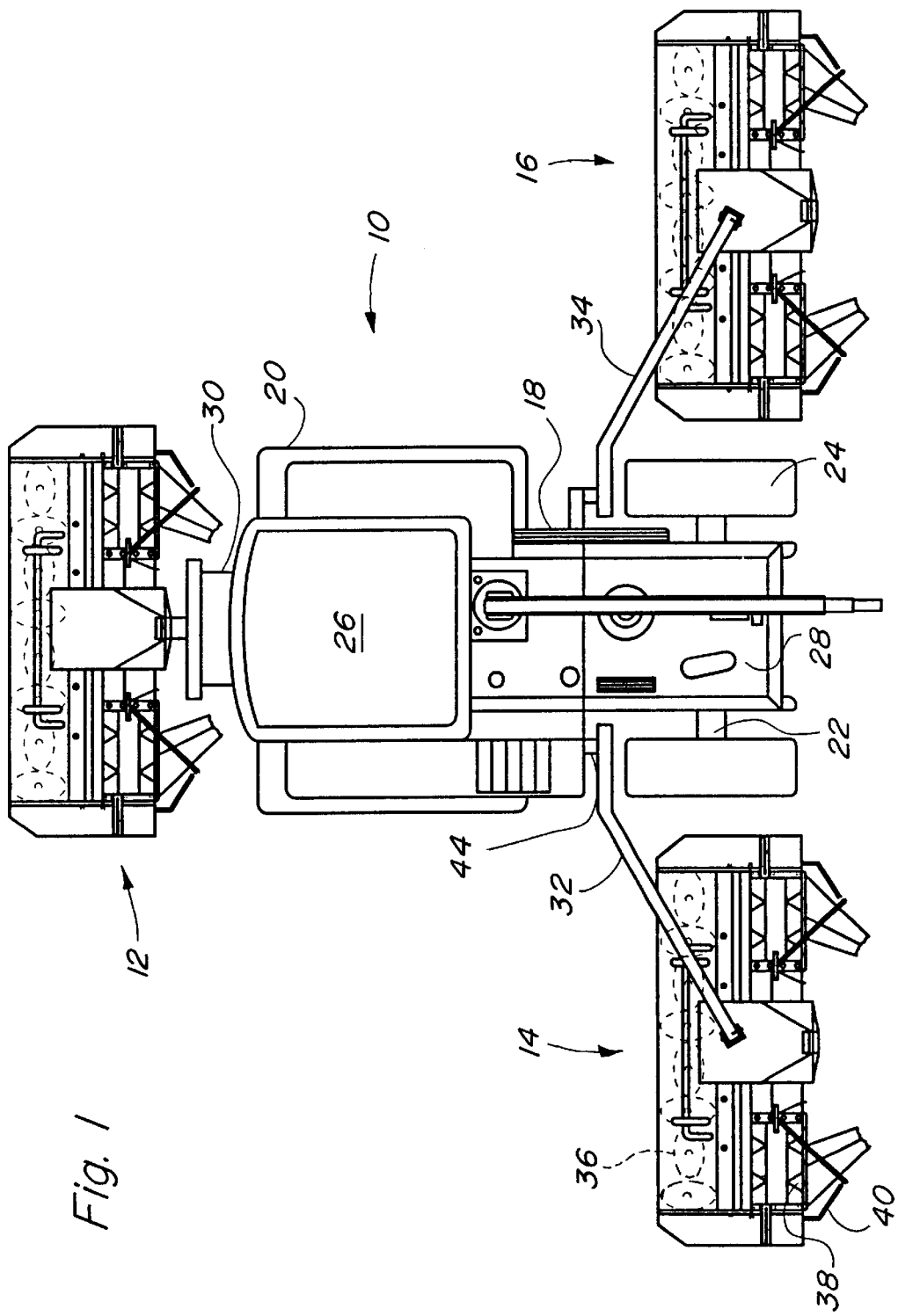
FIG. 1 is a top view of a vehicle having three mower-conditioner units mounted thereto, in accordance with a first embodiment of the invention, and shown in respective working positions.

Referring now to FIG. 1, there is shown a vehicle 10 to which there is attached a front, left and right working units 12, 14 and 16, respectively, according to a first embodiment of the invention. The vehicle in this example is a John Deere Model 6910 forage chopper manufactured by Deere & Company. It is to be noted that, in addition to being provided for use as original equipment with new forage choppers, the present invention is fully suitable for being mounted on the chassis of used forage choppers. Further, instead of such a forage chopper, other support vehicles, for example, a self-propelled pest control sprayer or the like could be used.

The vehicle 10 has a chassis 18, which is supported on the ground in its front region by wheels 20 coupled to an axle (not shown), and at its rear region on wheels 24 coupled to a rear axle 22. Chassis 18 carries an operator's cab 26 and an engine 28. A hitch 30 is provided at the front of the vehicle 10, and respectively provided at the left and right sides of the vehicle between the left set of wheels 20 and 24, and the right set of wheels 20 and 24 are left and right support devices 32 and 34.

The working units 12, 14 and 16 have the common feature that they are equipped with a mowing unit 36 positioned upstream from a conditioning unit 38. A swath or windrow forming device 40 is provided on the discharge end of each working unit 12, 14 and 16. The working units 12, 14 and 16 have the task of mowing crop growing on the ground, for example, grass, alfalfa, etc. and mechanically conditioning the harvested crop, i.e., acting on it so that the moisture contained in it can escape more readily so that it dries more quickly. While the front working unit 12 is at least as wide as the space between the outer edges of the front wheels 20, the lateral working units 14 and 16 can be wider or narrower. The use of the three working units running next to each other results in a total working width of about 9 m. However, the width of the entire vehicle 10 can be kept under the maximum admissible width for road travel when the lateral working units 14 and 16 are pivoted into a position in which they do not protrude over the sides of the front wheels 20.

Figure 2:
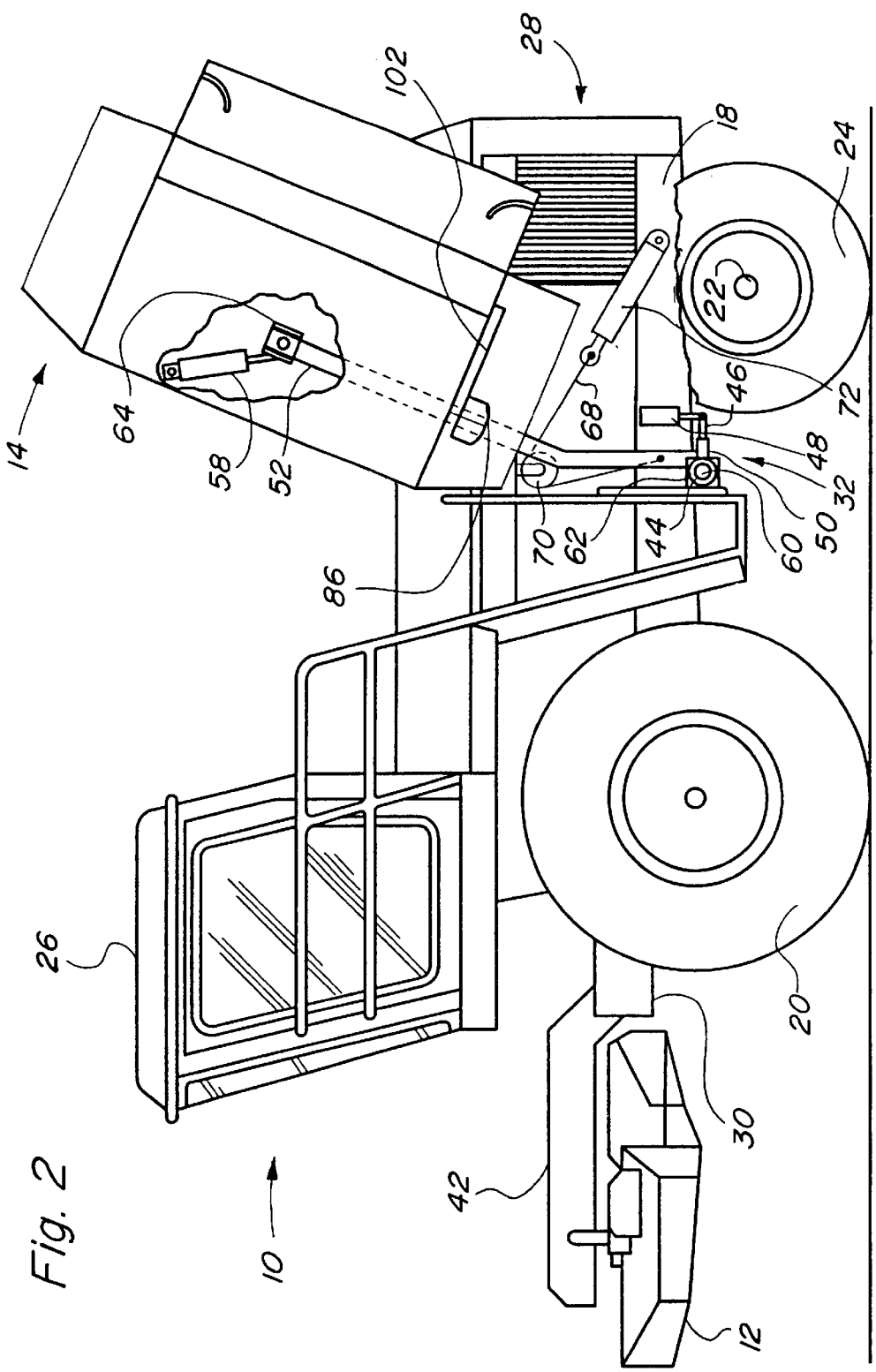
FIG. 2 is a left side elevational view of the vehicle shown in FIG. 1, but showing the mower conditioner units in respective raised, transport positions.

Referring now also to FIG. 2, there the vehicle 10 is shown with the working units 12, 14, and 16 in respective raised transport positions, with the right working unit 16 being obscured by the left working unit 14. It is apparent that the front working unit 12 and the left working unit 14 are raised into transport positions or pivoted upward, where the left working unit 14 now occupies a position above the left rear wheel 24.

The front working unit 12 is secured in the fashion of a so-called front mower with a conditioner, which contains a mounting bracket 42 on its rear end, which is releasably mounted on the hitch 30. The hitch 30 is shown only diagrammatically but may be of any known three- or two-point type including links coupled for vertical adjustment by servomotors and provided with hooks, eyes, etc. at the connection site between the mounting bracket 42 and the hitch 30, which serve for form-locking and releasable connections.

The lateral working units 14 and 16 are designed as identical mirror images relative to the longitudinal center axis of the vehicle 10. Mowing unit 36, conditioning unit 38, the swath-forming device 40 and the undesignated covering parts surrounding them are essentially existing crop conditioning units that are designed to be added to the three-point hydraulic systems of farm tractors and protrude laterally from the farm tractor. They will be described to the extent that they differ from conventional working units for the purpose of the present invention and insofar as support device 32 is concerned. The subsequent description pertains only to the left working unit 14, with it being understood that the right unit 16 is identical or at least similar to the left working unit 14.

To suspend the working unit 14, the support device 32 consists of a first bearing 44, a bearing arm 46, a servomotor 48, second bearing 50, an arm 52, an adjustment device 54, a third bearing 56 and a servomotor 58. The support device 32 is designed so that it can be added on as an assembly to already existing working units of vehicles, especially forage choppers.

Figure 3:
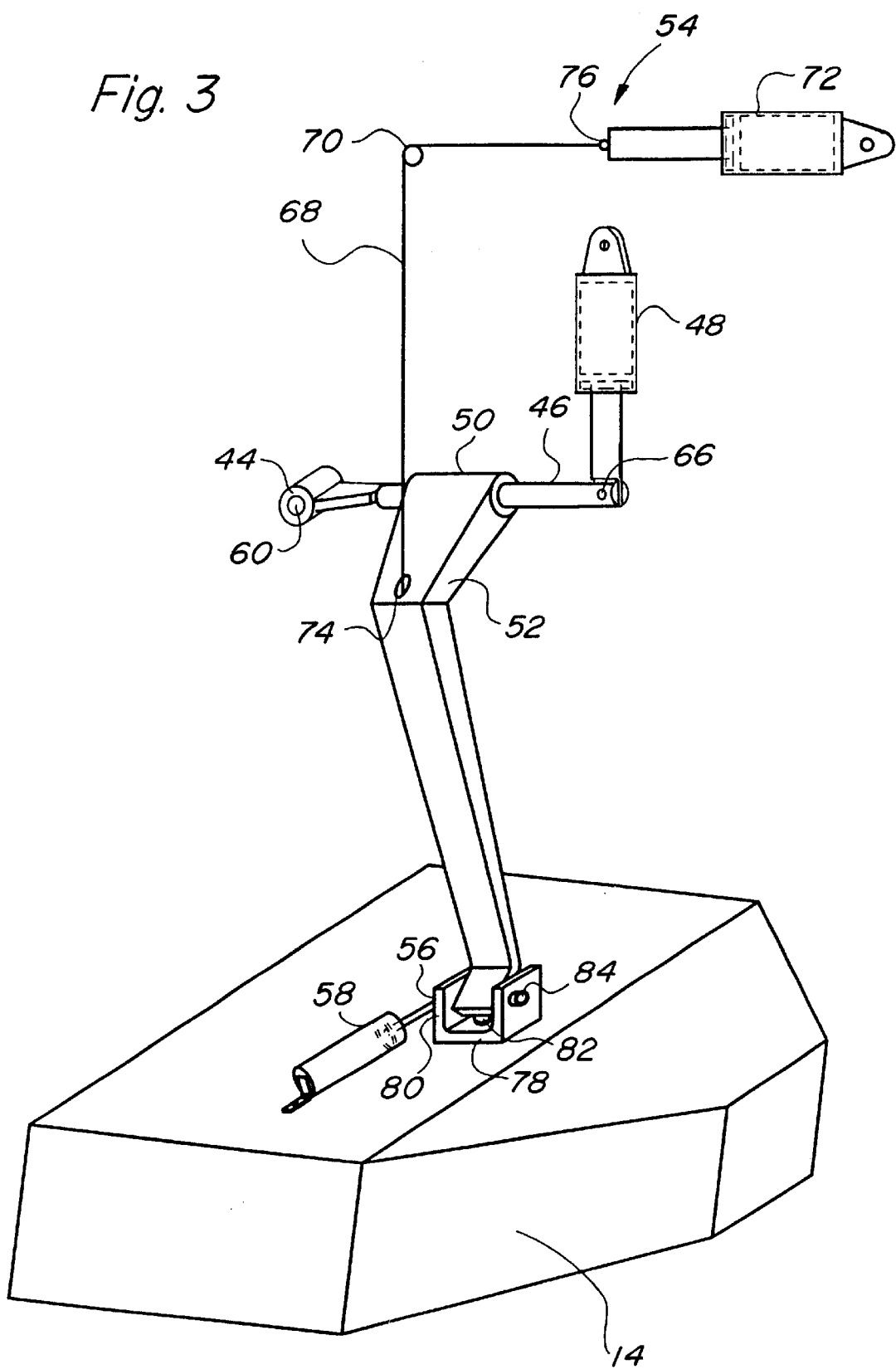
FIG. 3 is a somewhat schematic representation of the suspension for the left-hand side mower-conditioner unit.

Referring now also to FIG. 3, it can be seen that the bearing 44 is in the form of a cylindrical pipe fixed so as to be integral with a front end of the bearing arm 46. The bearing 44 is located between laterally spaced flanges 62 fixed to the chassis 18. The bearing 44 contains a bearing pin 60, which extends transversely to the direction of travel through the spaced flanges 62 so as to secure the bearing arm 46 to the chassis 18 so that the arm 46 may pivot vertically on the bearing pin 60. The servomotor 48 is pivotally attached to a rear end of the bearing arm 46 by a pivot pin or hinge 66 and is selectively extensible and retractable for pivoting the arm 46 vertically about the horizontal transverse axis defined by the pin 60. Thus, the bearing arm 46 is secured on one end in the connection defined by the pin 60 and the flanges 62, and on the other end by the servomotor 48, and is in the form of a pipe or round axle. The connection between the servomotor 48 and the bearing arm 46 is rigidly secured by locking elements. The servomotor 48 is designed as a single-acting hydraulic motor and is charged by a remotely controllable hydraulic system (not shown).

The second bearing 50 is in the form of a cylindrical, tubular sleeve or the like with the longitudinal center axis of the sleeve extending essentially in the direction of travel. The second bearing 50 is integral with an end region of the support arm 52 and mounted to pivot about the bearing arm 46. The arm 52 is mounted on the bearing arm 46 between the bearing pin 60 and the hinge 66, to pivot vertically. The arm 52 extends from the bearing arm 46 up to the center of the working unit 14 and is angled rearward for this purpose according to a first embodiment. This form of arm 52 can be simply achieved with a welded structure in which the required strength is attained by using hollow sections. Arm 52, at its end opposite the bearing 50, is mounted to pivot an axis defined by the third bearing 56. The adjustment device 54 engages on arm 52 between its ends in order to pivot arm 52 from a lowered, working position into a raised, transport position. Especially with respect to FIG. 2, it should be apparent that the outward lying, freely protruding end of arm 52 always lies essentially in the same vertical plane as the axis of rotation of the rear wheels 24. The shape of the arm 52 is chosen so that the working unit 14 is as far forward as possible, while permitting the working units 14 to be swung into a free space for transport.

The adjustment device 54, according to the first embodiment shown in FIGS. 2 and 3, is designed in a special manner in order to permit additions to the already existing vehicle 10 without having to significantly alter its chassis 18. Specifically, the adjustment device 54 of the first embodiment includes a tension medium 68, a guide roll 70 and a third servomotor 72. The tension medium 68 is designed as a steel cable and is secured at one end to an eye 74 on the arm 52, and the other end to an eye 76 on the third servomotor 72. A turnbuckle to adjust the effective length of the tension medium 68 and/or a dampening element, for example, a spring, can be provided in a manner, not illustrated, in the tension medium 68, which moderates impact due to ground undulations. The tension medium 68 can also be designed as a chain instead of a cable. The guide roll 70 is mounted on the chassis 18 and serves to guide the tension medium 68 between the arm 52 and the third servomotor 72 so that the motion of the third servomotor 72 running horizontally in the direction of travel can be converted to a vertically directed motion across the direction of travel. The third servomotor 72 is designed as a single-acting hydraulic motor and is anchored on the chassis 18 with its end region on the cylinder side. Activation of the third servomotor 72 occurs in remote controlled fashion from the driver's cab 26 in a conventional manner, not further shown. The third servomotor 72 is actuated to tighten and move the tension medium 68 to the rear over the pulley 70 so as to cause a lifting force on the arm 52.

The bearing 56 establishes the connection between the arm 52 and the working unit 14 and is mounted to pivot on both. The bearing 56 in the depicted embodiment is defined by a channel member having a U profile, with a bottom 78 and two flanges 80. The bottom 78 is penetrated by a vertical pivot pin 82, which is secured in the housing of the working unit 14 and permits it to make a horizontal pivoting movement relative to the arm 52. Flanges 80 have a horizontal shaft 84 passing through them and through the end region of the arm 52. Thus, the bearing 56 forms a universal joint connection between the arm 52 and the working unit 14. It is apparent that the working unit 14 can follow the contour of the ground by pivoting vertically about the shaft 84.

The servomotor 58 is also designed as a hydraulic motor, but as a double-acting one. The servomotor 58 is hinged on one end to the bearing 56 and on its other end to the housing of the working unit 14, namely its top. The working unit 14 can be pivoted about the pivot pin 82 by operation of the servomotor 58 and brought into a position with an optimal angle relative to the field still being mowed. Activation of the servomotor 58 is from the cab 26.

Finally, a drive 86, in the form of a hydraulic motor, is provided for operation of the working unit 14. This drive 86 is supplied with pressurized fluid via lines (not shown) in order to drive the mowing unit 36 and the conditioning unit 38 (if present). The connection of the drive 86 to lines on the chassis 18 preferably occurs via quick-change couplers. Drive 86, i.e., the hydraulic motor, is connected to a gear train 102 on the working unit 14 which drives both the mowing unit 36 and the conditioning unit 38.

It is readily apparent with respect to FIG. 2 that the working unit 14 can assume a transport position in which it is located above the rear wheel 24. It is also apparent that the working unit 14 is sloped rearward to the plane of travel so that the working unit 14 does not fully protrude on the top above chassis 18. Although not shown, supports can be provided on the chassis 18 on which the working unit 14 rests during transport.

The following is carried out to arrive in a position according to FIG. 2 from a position according to FIGS. 1 and 3. The servomotor 58 is operated so that it pivots the working unit 14 into the position shown in FIG. 2 with reference to the arm 52. The third servomotor 72 is then operated in order to draw the tension medium 68 and thereby pivot the arm 52 vertically about the bearing arm 46 until the working unit 14 has assumed a vertical position above the rear wheel 24. In this position, the working unit 14 lies with its top on the bottom of arm 52 and thus is prevented from tilting outward during transport. Arm 52 lies on the chassis 18.

Activation of the servomotor 48 only occurs regularly to change the working angle, for example, the cutting angle, of the working unit 14 relative to the ground. By means of the servomotor 48, the working unit 14, however, can also better be brought into the position above the rear wheel 24. Depending on the design of the support device 32, especially bearing 44, bearing arm 46 and servomotor 48, a bent or deviated variant of arm 52 can also be completely or partially dispensed with.

Figure 4:
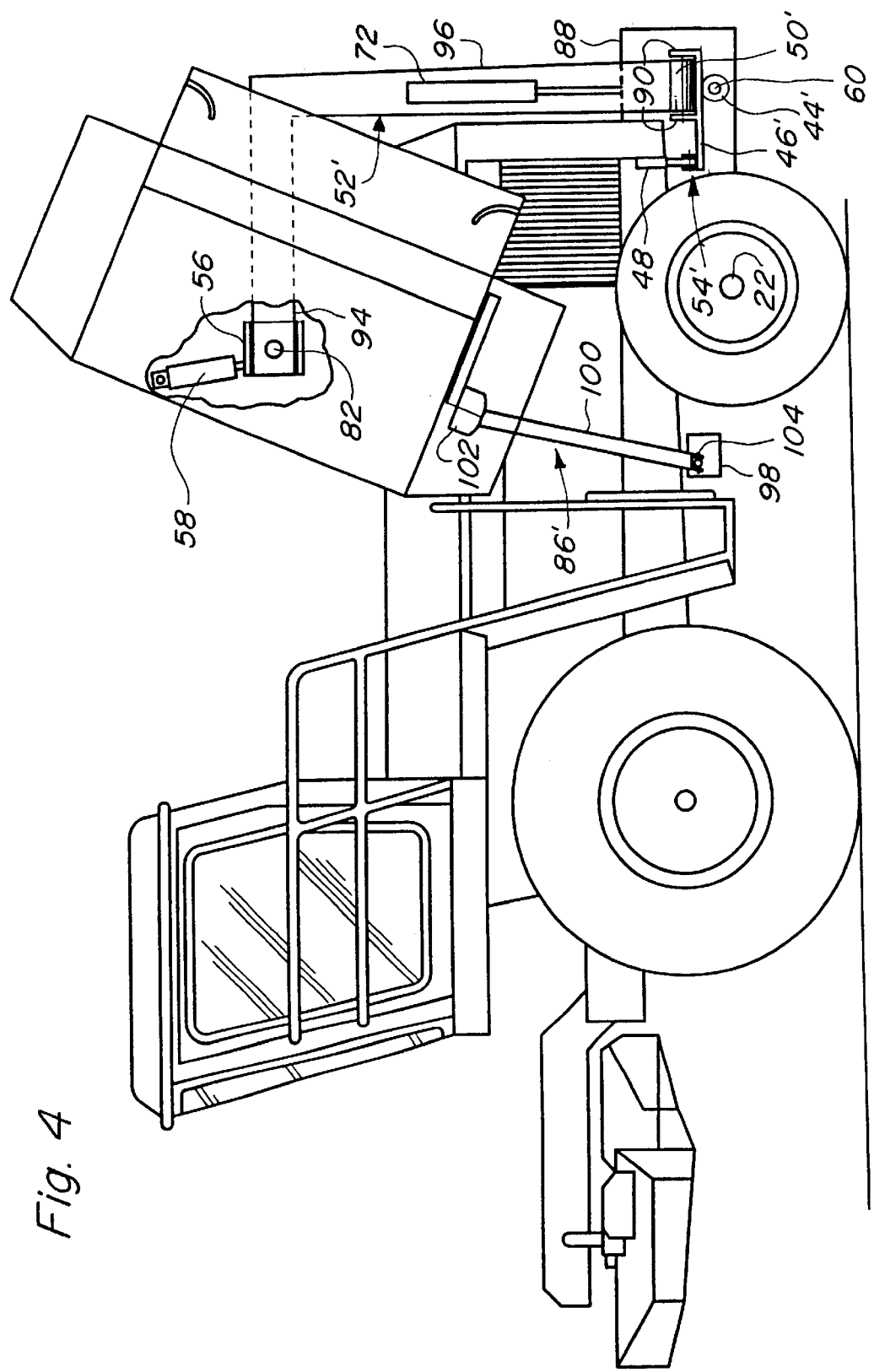
FIG. 4 is a view like FIG. 2 but showing a second embodiment of the invention with the side mower-conditioning units in respective raised, first transport positions.
Figure 5:
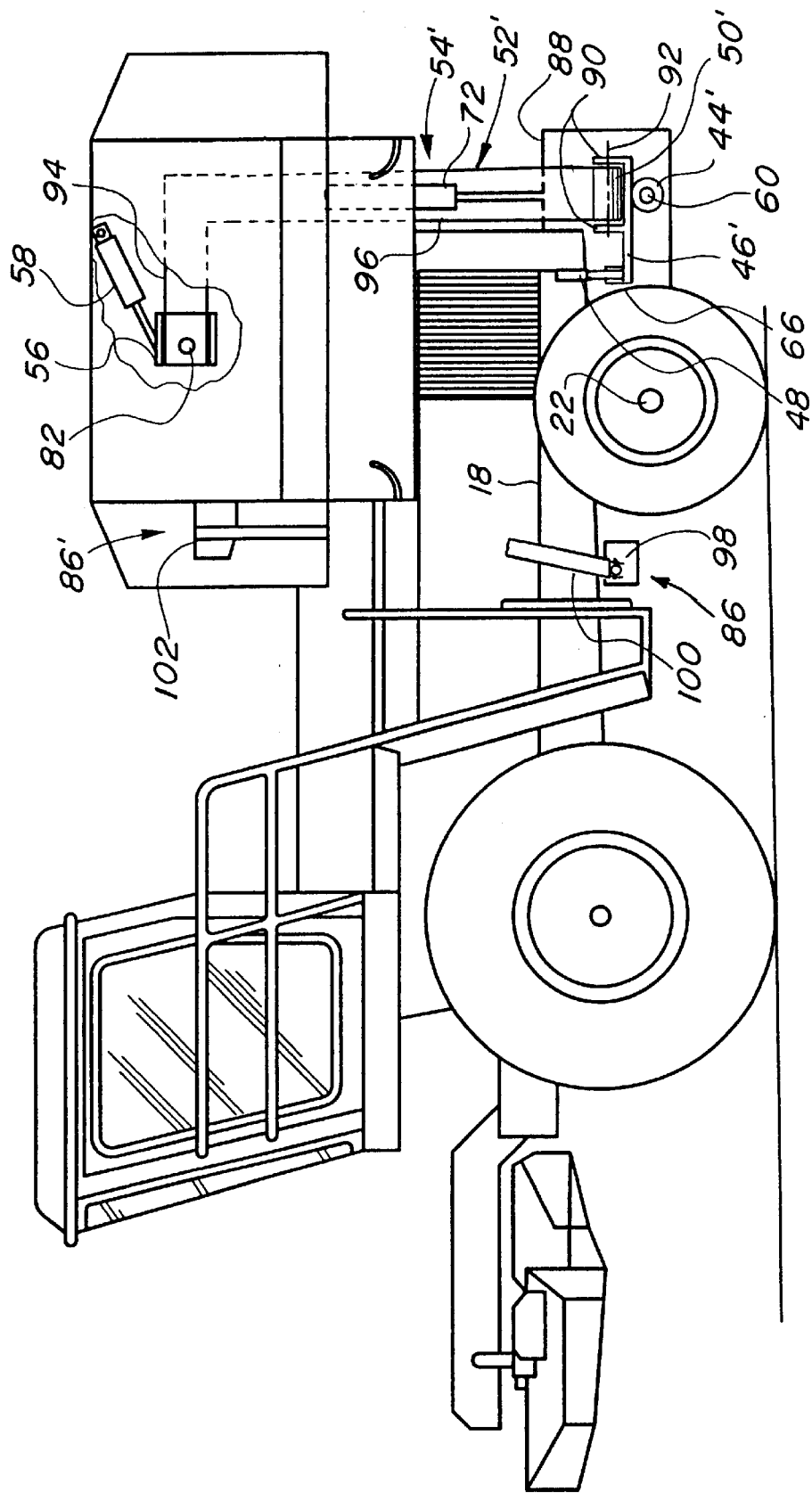
FIG. 5 is a view like FIG. 4 but showing the side mower-conditioning units in respective raised, second transport positions.

Reference is now made to FIGS. 4 and 5 in which parts which are identical to those described above are provided with the same reference numerals while those having a different shape but performing the same function are given the same reference numerals with the addition of a prime symbol. First, it is to be noted that the embodiment shown in FIGS. 4 and 5 differs from that according to FIGS. 1 through 3 essentially in that a support arm 52' is not mounted between the front and rear sets of wheels 20 and 24 like the arm 52 but rather is mounted to a support structure or accessory 88 at the rear of the chassis 18. In this embodiment, a bearing 44' is provided in a base portion of a bearing arm 46' designed in the form of a fork which can pivot vertically on the pin 60 which is received in the bearing 44'. The bearing arm 46' includes a pair of fore-and-aft spaced, transverse flanges or cross pieces 90 joined so as to extend upright from the base of the arm 46' in approximately symmetrical relationship to the pin 60. A pivot pin (not visible) extends through the bearing 50' which is in the form of a cylindrical sleeve provided at an end region of the support arm 52' so as to define a fore-and-aft pivot axis 92 about which the arm 52' may be pivoted vertically by the servomotor 72, the latter being connected directly between the arm 52' and the support member 88. The servomotor 48 is coupled between the chassis 18 and the front end of the bearing arm 46' and is selectively operable for pivoting the bearing arm 46' about the pivot pin 60. Arm 52', like the previously described arm 52, is mounted to the working unit 14 by the universal coupling defined by the channel-like bearing 56 and the pivot pins 82 and 84 (shown only in FIG. 3). Thus, the arm 52' can be pivoted vertically between a lowered working position and at least one raised transport position. Because of the connection of arm 52' to the chassis 18 or accessory 88 with essentially greater spacing to the axis of rotation of the rear wheels 24 in comparison with the embodiment according to FIGS. 1–3, arm 52' is bent much more and even has a 90° bend in order to end essentially above the center of the rear wheel 24. The design and arrangement of arm 52' is such that it is located outside the chassis 18 in the transport position, i.e., with one arm section 94 running lengthwise, i.e., in the direction of travel on the top, and with one arm section 96 running transversely, i.e., transverse to the direction of travel on the back of chassis 18. In this manner, the working unit 14 can be fully positioned on the chassis 18.

The adjustment device 54' includes only the servomotor 72, which is anchored directly at one end to the arm 52' and at the other to the chassis 18 or accessory 88. The servomotor 72, which is single-acting, is arranged so that it pivots arm 52' upward, whereas the arm 52 descends due to gravity. Due to the free space behind chassis 18, the servomotor 72 can move freely in the direction of motion of the arm 52' so that it does not require a reversal of direction of movement by a tension medium 68, for example. Bearing 56, servomotor 58, pivot pin 84 and shaft 82 are designed as in the first embodiment and possess the same function. In this embodiment, a drive 86' includes a gear train 98 and a telescoping drive shaft 100. Gear train 98 is mounted on the bottom of the chassis 18 and may be driven by any one or a combination of belts, chains, shafts or hydraulic motors (not shown), The telescoping shaft 100 produces the connection between the gear train 98 and a gear train 102 located on the housing of the working unit 14, with the connections between opposite ends of the shaft 100 and gear trains 98 and 102 being by universal joints of which only a u-joint 104 is shown between the gear train 98 and the shaft 100. The use of universal joints permits rapid separation of the drive for transport or with a completely disassembled working unit 14, whereas the telescoping design permits relative movement between working unit 14 and chassis 18. The universal joints are expediently designed as wide-angle joints in order to achieve high uniformity of movement during operation even with large relative movements.

As respectively shown in FIGS. 4 and 5, the working unit 14 can assume two transport positions, both of which are attained by actuation of the servomotor 58, as well as the working position, in similar fashion to that shown in FIG. 1.

The transport position according to FIG. 4 corresponds to that of FIG. 2 for the first embodiment, however, here the arm 52' has a different position and the working unit 14 lies against the chassis 18 since the arm 52' is not located between the chassis and the arm. The telescoping shaft 100 remains connected and the working unit 14 remains ready for operation. This transport position is suitable for short transport trips or when the working unit 14 must be raised to achieve a small mowing width. The servomotor 58 is only slightly extended for this purpose.

In the transport position according to FIG. 5, the working unit 14 assumes a position in which its longitudinal center axis extends essentially in the direction of travel. The servomotor 58 is extended relatively far and the telescoping shaft 100 is separated or disassembled. Depending on the design of the bottom of the mowing unit 36 and/or the conditioning unit 38, the working unit 14 can also be supported on chassis 18. This transport position is designed for longer transport trips and also has the advantage that the working unit 14 does not protrude above the height of the operator's cab 26. As in the first embodiment, the servomotor 72 is used to pivot the arm 52' vertically, servomotor 48 serves to change the cutting angle of the mowing unit 36 and/or the position of the working unit 14 relative to the chassis 18, and the servomotor 58 adjusts the working unit 14 relative to the arm 52' in order to assume the correct transport position and/or to adjust the cutting angle relative to the direction of travel.

Although the main application of the present invention will be for mower or mower-conditioner type working units, application to other machines is possible, especially tedders, circular self-cleaning harrows, conditioners only, cultivators, harrows, etc.

Whereas the working units 14 and 16 in the depicted embodiments assume a transport position above the rear wheels 24, the transport position could also be above the front wheels 20, this being particularly feasible when the smaller set of wheels is located in the front, which, however, is not a requirement.

Further, it is to be noted that the arms 52 or 52' could be designed as a double arm straddling the rear wheel axle 22, thereby reducing bending moments.

What is claimed is:

1. In a self-propelled agricultural vehicle having a chassis supported on front and rear sets of wheels, and at least one working unit being attached to a side of the chassis by a support arm moveable between a lowered working position and a raised transport position, and an actuator coupled between the chassis and said arm for moving the latter between said working and transport positions, the improvement comprising: a coupling structure mounting an inner end of said support arm to said chassis at a location inwardly of an outer surface of one of said wheels of one of said front and rear sets of wheels; said support arm being so configured and located relative to said one of said front and rear sets of wheels that said working unit is moved to a position occupying space vertically above a respective wheel of said one of said front and rear sets of wheels when said arm is moved to said transport position.

2. The self-propelled agricultural vehicle as set forth in claim 1 wherein said support arm is configured so as to occupy space vertically above said chassis only when said arm is moved to said transport position.

3. The self-propelled agricultural vehicle as set forth in claim 1 wherein said support arm has a first end region attached to said chassis for pivoting at one of a location forward or rearward of said rear set of wheels; and said support arm being configured for positioning said working unit so as to occupy a space vertically above said respective wheel of said rear set of wheels when said arm is moved to said transport position.

4. The self-propelled agricultural vehicle as set forth in claim 1 and further including a bearing pivotally coupling said arm to said working unit.

5. The self-propelled agricultural vehicle as set forth in claim 1 and further including a bearing arm vertically pivotally mounted to said chassis; and said support arm including a first end region defining a bearing mounted for pivoting on said bearing arm.

6. The self-propelled agricultural vehicle as set forth in claim 5 wherein said support arm has a second end region; a second bearing defining a universal coupler joining said second end region of said support arm to said working unit and establishing a pivot axis, which is upright when said working unit is in its working position and about which said working unit may pivot; and an actuator coupled between said working unit and said universal coupler for selecting a desired orientation of said working unit about said pivot axis.

7. The self-propelled agricultural vehicle as set forth in claim 6 wherein said second region of said support arm is coupled to said working unit at a location essentially vertically above a center of gravity of said working unit; and said support arm being bent between its first and second end regions so that said second end region terminates essentially in a space vertically above an axle of said rear set of wheels when said support arm is in its transport position.

8. The self-propelled agricultural vehicle as set forth in claim 1 wherein said chassis and working unit respectively carry first and second drive arrangements; and a telescopic drive shaft extending between said first and second drive arrangements.

9. The self-propelled agricultural vehicle as set forth in claim 1 wherein said working unit is provided with a drive arrangement including a hydraulic motor.

10. The self-propelled agricultural vehicle as set forth in claim 1 wherein said vehicle is a forage chopper; and, in addition to said at least one working unit, a further working unit is mounted to a forward end of said chassis of said forage chopper.

11. The self-propelled agricultural vehicle as set forth in claim 10 wherein a pair of working units, including said at least one working unit, are mounted to opposite sides of said chassis respectively through the use of first and second support arms; said support arms each having a first end region vertically pivotally mounted to said chassis at a respective location forward of said rear set of wheels; and said support arms being configured such that said pair of working units are respectively located in general transverse alignment with said rear set of wheels when said support arms are in lowered working positions.

12. The self-propelled agricultural vehicle as set forth in claim 10 wherein a pair of working units, including said at least one working unit, are mounted to opposite sides of said chassis respectively through the use of first and second support arms; said support arms each having a first end region vertically pivotally mounted to said chassis at a respective location rearward of said rear set of wheels; and said first and second support arms each being configured such that said pair of working units are respectively located in general transverse alignment with said rear set of wheels when said support arms are in lowered working positions.

* * * * *